United States Patent
Gottfriedsen et al.

(10) Patent No.: US 9,188,475 B2
(45) Date of Patent: Nov. 17, 2015

(54) BRIDGE ELEMENT

(71) Applicant: Wipotec Wiege-und Positioniersysteme GmbH, Kaiserslautern (DE)

(72) Inventors: Jan Gottfriedsen, Waldfischbach-Burgalben (DE); Tobias Stellwagen, Kaiserslautern (DE)

(73) Assignee: Wipotec Wiege- und Positioniersysteme GmbH, Kaiserslautern (DE)

( * ) Notice: Subject to any disclaimer, the term of this patent is extended or adjusted under 35 U.S.C. 154(b) by 101 days.

(21) Appl. No.: 13/725,755

(22) Filed: Dec. 21, 2012

(65) Prior Publication Data

US 2013/0168163 A1    Jul. 4, 2013

(30) Foreign Application Priority Data

Dec. 30, 2011   (EP) .................................. 11 401 682

(51) Int. Cl.
| | |
|---|---|
| G01G 3/00 | (2006.01) |
| G01G 21/16 | (2006.01) |
| G01G 21/23 | (2006.01) |
| G01G 21/24 | (2006.01) |

(52) U.S. Cl.
CPC .................. *G01G 3/00* (2013.01); *G01G 21/16* (2013.01); *G01G 21/23* (2013.01); *G01G 21/244* (2013.01)

(58) Field of Classification Search
CPC  G01G 3/14–3/147; G01G 3/00; G01G 21/16; G01G 21/23; G01G 21/244
USPC ........... 177/201, 210 R, 211, 210 C, 210 EM, 177/210 FP; 73/862.621, 862.627, 862.628, 73/862.629, 862.632, 862.633, 862.634, 73/862.637, 862.638, 862.639
See application file for complete search history.

(56) References Cited

U.S. PATENT DOCUMENTS

| | | | | |
|---|---|---|---|---|
| 4,274,501 | A * | 6/1981 | Gallo et al. ............. | 177/210 FP |
| 4,453,608 | A * | 6/1984 | Wirth et al. ............. | 177/210 FP |
| 4,505,345 | A * | 3/1985 | Jetter ............................. | 177/211 |
| 5,962,818 | A * | 10/1999 | Komoto et al. ................ | 177/229 |
| 6,365,847 | B1 * | 4/2002 | Muller et al. .......... | 177/210 EM |
| 6,886,418 | B2 * | 5/2005 | Metzger et al. .......... | 73/862.631 |
| 7,282,655 | B2 * | 10/2007 | Satoh et al. ............ | 177/210 EM |
| 7,534,971 | B2 * | 5/2009 | Kuhlmann et al. ..... | 177/210 EM |
| 8,232,484 | B2 * | 7/2012 | Hauck .................... | 177/210 EM |

(Continued)

FOREIGN PATENT DOCUMENTS

| | | |
|---|---|---|
| JP | H10160551 A | 6/1998 |
| JP | 2002 090217 A | 3/2002 |

(Continued)

OTHER PUBLICATIONS

Machine translation of JP 3,594,893 downloaded Jul. 15, 2014.*
JPO, Notification of Reason for Refusal issued Jan. 24, 2014 in corresponding Japanese Patent Application No. 2012-275943 (4 pages).

*Primary Examiner* — Peter Macchiarolo
*Assistant Examiner* — Natalie Huls
(74) *Attorney, Agent, or Firm* — The Culbertson Group, P.C.

(57) ABSTRACT

A precision weighing device is provided formed with a balance having a bridge element, which realizes a parallel guidance between a load receptor and base body by means of force-transmitting levers arranged in advantageously inside the bridge's structure. A balance is made insensitive to corner loads with a spaced-apart arrangement of two bridge elements having the features herein.

19 Claims, 4 Drawing Sheets

(56) References Cited

U.S. PATENT DOCUMENTS 8,383,965 B2 * 2/2013 Erben et al. .................. 177/184
2013/0168164 A1 * 7/2013 Gottfriedsen et al. ........ 177/201

FOREIGN PATENT DOCUMENTS

JP         3594893    * 12/2004   ............. G01G 21/26
JP      2006113011 A    4/2006

* cited by examiner

BRIDGE ELEMENT

TECHNICAL FIELD

The present invention relates to a bridge element, particularly for a precision balance.

BACKGROUND

Precision weighing technology demands increasingly high measurement resolution and precision, while at the same time requiring that balances handle ever-broadening measurement ranges. Thus, products with markedly differing weights and spatial dimensions are to be weighed in continuous operation, sometimes at very high transport speeds.

Monolithically constructed weighing cells with integrated lever transmissions operating according to the principle of electrodynamic force compensation are known for use in precision balances. Such systems with single transmission are usable only up to a weight of roughly 30 kg. To extend the measurement range, a stronger magnet system can be chosen, along with the associated high costs, or the transmission ratio of the lever mechanism can be increased. In the case of multiple transmissions, however, the resolution of the measurement system that can be picked up at the final lever decreases. Moreover, the production of monolithic multiple transmissions is technically elaborate and often not possible at all, due to the small amount of installation space available.

Also, the parallel rod connections between the stationary bases and the load receptors usually provided for monolithic weighing cells cannot be used due to their low load-bearing capacity. The torques that act on the parallel rod construction in the case of an eccentric load on the load receptor are particularly difficult to manage and negatively influence the accuracy of the balance. A spatial enlargement of the parallel rod construction is expensive and increases the difficulty of producing undercuts between the parallel rods, which must be wider in this case.

What is needed is a way to provide a precision balance in order to be able to weigh materials having a wide variety of different weights and dimensions with high resolution and measurement precision, with simultaneous insensitivity to torques.

SUMMARY OF THE INVENTION

A bridge element is provided that works on a principle that, by distributing the total weight force to be detected onto separate levers, the load per lever can be reduced in order to reduce the stress on individual lever mechanisms. The forces, initially stepped down separately, are combined on a stepdown stage that can be specified in design terms, in which the forces are smaller, and are then supplied to a load cell (the terms "step down" and "step up" are to be understood to mean a targeted change of a lever force based on the respective lever arms; both terms can mean an amplification or a reduction). A narrow or flat design, which allows the compact construction of balances and also the arrangement of several balances with relatively little space between them, is an advantageous feature. The lever arrangement between a load receptor and a base section to be described below advantageously allows the compact construction of the component according to the invention.

The principle of electrodynamic force compensation in particular, though not exclusively, should be considered for the conversion of the weight force into an electrically measurable form, so that the load cell can be designed according to such a principle.

The bridge element according to the invention also inventively obviates the need for a parallel rod construction, as was previously provided for monolithic weighing cells, which simplifies the structure. Instead, the parallel levers, which step down or transmit the weight force exerted on the balance or a partial force thereof, take over the guidance of the load receptor along vertical parallels. Thus an element for a balance is created that dispenses completely with a pure parallel rod construction and simultaneously steps down and combines various-sized component forces as necessary in order to be able to weigh with high precision over large load ranges. The use of several such bridge elements arranged apart from one another that jointly experience the weight force to be measured allows the subdivision of this total weight force over more than two lever systems, whereby the load per lever system is again reduced and the balance overall can weigh larger loads.

The bridge elements according to the invention also reduce the corner sensitivity (which is known and is problematic for monolithic weighing cells with parallel rod construction). A possibly eccentric load on a load receptor in the case of side-by-side bridge elements cannot cause torsional moments in the (no longer present) parallel rods. Finally, the arrangement of levers, which are mainly or exclusively in the bridge elements, allows the creation of free spaces between several bridge elements, so that balances with several bridge elements advantageously offer installation space for other components therebetween.

A bridge element according to the invention contains force-transmitting levers with which a weight force can be stepped down and/or transmitted to a load cell. The bridge element further comprises a base section, which has a substantially elongated shape and extends in a first horizontal longitudinal direction X from one end to the opposing other end. In a second direction Y, perpendicular to the first direction and likewise horizontal, the base section is narrow. A load receptor, which runs similarly in space to the base section, is provided above the base section. It is vertically above the base section in a third direction Z perpendicular to the two directions X and Y. A force introduced into the load receptor, which in particular can be a component of a weight force acting on a balance, is to be transmitted, preferably in stepped-down form, to a load cell by means of the levers supported at bearing points on the base section.

According to the invention, the load receptor acts via a first point of action on a first lever and via a second point of action on a second lever constructed separately from the first lever, so that a component force introduced into the load receptor is initially distributed onto these two levers and from there can be transmitted in the direction towards the load cell. The term "direction" in this context means the path that forces follow along physical components of the bridge element from the load receptor to the load cell.

Each of the two levers is supported on the base section via a bearing point and, according to one embodiment of the invention, these are coupled to one another to form a sum force in order to route the sum force to a load cell. For purposes of simplification, the forces introduced by the load receptor in two different levers become a single, expediently stepped-down, force that can be transmitted or evaluated in the bridge element. The formed sum force could be routed to the load cell for this purpose without further stepping-down. Alternatively, however, it is also conceivable to vary the sum force by means of additional levers and, in particular, to step it down and only route it to the load cell in this stepped-down form. An alternative embodiment connects the two first two levers loaded by the load receptor to additional mutually independent levers for force reduction or force transmission, in order to realize the coupling of the separated lever systems only after an additional or later transmission stage.

According to the invention, the load cell is located in the vertical direction Z between the lower base section and the load receptor and/or in the lateral direction between the two bearing points for the two levers connected to the load receptor. Such a feature advantageously yields a particularly compact construction. The load cell is enclosed by the lower base section and the upper load receptor and lies therebetween, so that it is advantageously unnecessary to arrange the load cell outside the bridge element, i.e., outside the area between the load receptor and the base section. An alternative or additional feature according to which the load cell is located between the two bearing points of the levers connected directly to the load receptor has an equally advantageous effect. The space located horizontally between these bearing points in the bridge element is well-suited for accommodating the load cell or other components of a force compensation system, without space having to be provided outside the area between the bearing points.

This favorable arrangement is made possible particularly by the simultaneous connection of the load receptor to two levers arranged substantially parallel to the load receptor, which in turn are supported on the base section, wherein a construction space between the load receptor and the base section can be used for the components of the force compensation system.

In monolithic weighing cells known in the prior art, a parallel rod construction is used to guide the load receptor, movable in the vertical direction, with respect to a stationary base section, while the transmission and stepping-down of the weight force acting on the load receptor is made possible via a lever construction additionally acting on the load receptor. To avoid this increased construction expense, another advantageous embodiment of the invention provides that the load receptor be guided by both the first and the second levers acting on the load receptor along vertical parallel lines in the Z direction. According to the invention, the first two levers replace the parallel guidance known from and required by prior art and simultaneously transmit the main load to be guided from the load receptor to the load cell. Such a bridge element functioning as a weighing cell also advantageously does without the formation of a separate parallel guide in regular operation and instead combines both functions in the levers alone. This not only reduces the manufacturing expense, but also the minimum dimensions of the bridge element and also supports the preferred narrow and compact construction.

A particularly simple embodiment of the invention, also advantageous for the above-mentioned parallel guidance, provides that the levers coupled directly to the load receptor act on a coupling member at a common coupling position in order to combine the lever forces and transmit them as a sum force. Due to this coupling of the first two levers at a common coupling position and by suitable selection of the lever lengths, the load receptor experiences a parallel guidance along two vertical parallels in the downward Z direction when vertical (also differing) forces are introduced along the load receptor. In other words: The two ends of the load receptor move downward simultaneously by the same magnitude when the load receptor is under load ("move" is meant in the virtual sense here, because a movement is to be avoided or compensated in case of electromagnetic force compensation. Mobility applies to the lever mechanism as a whole, however). Thus, a defined movement of the load receptor relative to a base section functioning as a base body is guaranteed and the torsion-sensitive parallel rod construction formerly necessary for monolithic balances is superfluous because the movement of the load receptor relative to the base section functioning as a stationary base is instead defined and assured by the force-transmitting levers themselves along vertical parallel lines (hereinafter "parallel guidance"). The levers thus fulfill a double function. The load receptor preferably obtains the parallel guidance exclusively by means of the force-transmitting lever of the bridge element, i.e., not by additional construction means for parallel guidance that are not simultaneously being used for transmitting the force of a weight force. The structure of the bridge element and the balance constructed therewith is thus simplified advantageously, which saves time and expense.

The coupling of the two levers, with which the respective lever forces are superimposed to form a common sum force, advantageously takes place at the section of the coupling member designed as a joint. This can be a monolithically produced thin section at which the two separate levers contact at one side of the thin section (or with successively offset-arranged connecting sections in the Y direction) while the coupling member adjoins the other side of the thin section, which is not divided there. This coupling member can then be used as an additional lever immediately adjoining the coupling point, further stepping-down the sum force and supporting a component of the load cell or of a position recognition system for example. Thus the bridge element can advantageously do without the coupling element frequently arranged between two successive levers, whereby the production expense decreases and compact construction is favored. However, a coupling element that transmits only the sum force (and is not designed as a step-down lever) could also act on the coupling position in order to transmit the sum force for further processing.

Therefore, by virtue of the coupling of the levers at the coupling position,
a) two component forces from different levers are combined into a sum force,
b) the levers are mechanically connected to one another in such a manner that they fulfill a parallel guide function, and
c) allow direct connection to a downstream lever by the space-saving foregoing of a coupling element.

The structure of the bridge element and a balance constructed therewith is thus advantageously simplified, which saves manufacturing time and costs.

The two levers directly acted upon by each load receptor of a bridge element are separated or formed separately from one another. The term "separated" is intended to mean a physically independent construction of the lever, so that each lever has a support point of its own as the fulcrum of the lever, its own lever arms and its own force application points and the lever is physically identifiable and distinguishable from a different lever. "Separate" does not exclude the possibility, however, that the lever may be coupled to a different lever in the area of a force application point, or to a different section of the bridge element (also monolithically), which preferably is done in an articulated manner via a flexible thin section.

According to an advantageous embodiment of the invention, all levers connecting to the first two levers or used for weight transmission are arranged spatially substantially between the load receptor and the base section of the bridge element, preferably one above another in the vertical Z direction. The bridge element thus takes on as narrow or elongated a shape as possible and is accordingly especially suited for application in a multitrack balance with two or more bridge elements separated from one another. Because the force-transmitting levers of a balance with two bridge elements, for example, are limited substantially to the area occupied by the bridge elements, the area between the bridge elements advantageously remains free as a construction space for other balance components such as a transport device or its motor. The reserved construction space can also be used for housing calibration plates and weights, electronic components, vibration and acceleration sensors, etc.

The dimensions of the load receptor or the base section expediently determine the outer dimensions of the entire bridge element in relation to different projection planes. Thus the bridge element according to another advantageous embodiment of the invention is especially compact, according to which each lever used for force transmission or transfer is arranged on the bridge element in such a manner that the projection of the lever onto an X-Y plane, at least in the X direction and preferably also in the Y direction, does not project outside the projection of the base section or of the load receptor. In a plan view of the bridge element from above, in which substantially only the load receptor can be seen, or in the opposite view of the bridge element from below, in which substantially only the base section can be seen, the levers of the bridge element do not protrude from the side. It is correspondingly easy to arrange several bridge elements according to the invention closely alongside one another in the X direction or the Y direction in order to be able to arrange several bridge elements functioning as weighing cells with the smallest possible space requirement. A section of a lever protruding laterally out of the bridge element would run counter to this tight arrangement and is avoided with the above-mentioned requirement.

In order to be able to construct the bridge element and its levers as stably and rigidly as possible, another embodiment of the invention provides that the width of some, preferably all, levers in the Y direction substantially corresponds to that of the load receptor and or the base section. The levers can then utilize the entire width of the bridge element available to them and also transmit higher loads safely. The bearing points of some, preferably all, levers are also expediently designed to have the same width in the Y direction as that of the load receptor and/or the base section. The bearing points then utilize the entire width of the bridge element for stably supporting the levers. As will become clear when viewing FIG. 1, such a bridge element has substantially the shape of a cuboid base body, in which the levers and bearing points penetrate the body over its entire width, which allows particularly simple production. For the purpose of achieving a narrow construction, the levers of the bridge element, as well as the load receptor and the base section, preferably run parallel to one another, one above another and substantially in the X direction. The lateral extension in the Y direction, on the other hand, should be kept small.

According to the invention, the space occupied by the bridge element is determined substantially by the outer dimensions of the load receptor and/or the base section. In a vertical plan view, the load receptor and the base section preferably have substantially the same outside dimensions, one preferably being exactly congruent with another, in the Z direction. Preferably, none of the levers of the bridge element extend beyond the sides of the bridge element in the horizontal direction (X-Y), in order not to disrupt the narrow shape and the tightly adjacent arrangement of several identical bridge elements. Of course the bridge element maintains its narrow shape especially if even the load cell or other components of the electromagnetic force compensation do not extend beyond the sides of the bridge element. In a vertical plan view, the load receptor or the base element should determine the maximum horizontal elongation of the entire bridge element with all its levers and other components. With the transmission levers ideally situated between the load receptor and the base section, the bridge element maintains its narrow elongated design, which is particularly favorable for the monolithic processing due to the comparatively small horizontal width in the Y direction.

The bridge is also advantageously formed without projecting areas on the base section. An area is "projecting" if it extends horizontally with one end free in the X direction (possibly also in the Y direction) between superimposed material-free areas in the vertical Z direction, in order to form a bearing point for a lever at its free end. Doing without such projecting areas simplifies the production of the bridge element and, due to the avoidance of torsional moments, increases the rigidity of the bridge element and thus the precision of the measurement result. The overall height in the vertical direction can also be advantageously reduced as compared to the prior art by doing without the projecting sections.

To avoid projecting material sections, there is therefore a direct material connection in the vertical Z direction of one, preferably all, bearing points into the area of the actual base section, which runs in the X direction analogously to the load receptor. For a projecting section that has a bearing point, on the other hand, there is a material interruption in the vertical Z direction (recess or gap in the monolithic material block, which must be circumvented laterally in order to support the bearing point with respect to the base section). Because a certain deformation under load always accompanies a projecting section comprising a bearing point, this disadvantage is avoided by the above-mentioned construction of the bridge element. Instead, the bearing points are supported directly or completely in the vertical Z direction on the base section without the force introduced by the lever into the bearing point having to be deflected in the X direction.

A particularly expedient embodiment of the bridge element further provides that the first and second levers, each directly coupled to the load receptor, pivot in mutually opposing rotational directions in the case of a vertical load on the load receptor. This allows the substantially symmetrical construction of the bridge element and the formation of the above-mentioned sum force roughly in the center of the bridge element in relation to the X direction. In case of a mirror symmetric construction of the two levers acting on the load receptor, one lever will rotate in the direction opposite that of the second lever under a vertical load on the load receptor. For a bridge element in which each of these two levers is implemented as a two-armed lever and arranged one after the other in the X direction, the two other lever arms not under load then move in the same direction, which simplifies coupling them to form the above-mentioned sum force. Precisely this arrangement also allows the particularly simple parallel guidance of the load receptor, as will be seen in the figures.

The pivot axes formed at the bearing points of the first two levers (as shown in FIG. 1) then preferably lie in a single horizontal X-Y plane. In the case of straight levers, they then have the same Z level alongside one another or one after the other, which simplifies the symmetrical construction of the bridge element. The first two levers acting directly on the load receptor especially favorably also have identical lever ratios. A coupling of these two levers in common at their ends not connected to the load receptor leads to an accurate parallel guidance of the load receptor.

As already mentioned, the bridge element should be constructed as compactly as possible. The arrangement of the levers in such a manner that they can be pivoted about mutually parallel pivot axes also contributes to this, this preferably applying to all levers of the bridge element. The levers then pivot in a common plane or at least in several mutually parallel planes, but not in planes running transverse to one another. If all levers move in the X-Z direction and not transversely thereto in the Y direction, then all pivot axes of the levers can be produced by cutouts in the monolithic body that pass through the body in the Y direction. This also simplifies production and reduces the cost of the bridge element.

According to another advantageous embodiment of the invention, the load receptor and/or the base section are symmetrically divided by a vertical X-Z plane. The two elements are thus symmetrical to this plane and therefore formed identically, which simplifies production. Simple cutouts penetrating the monolithic material block in the Y direction lead to such a symmetrical construction of the load receptor or the base section, so that in particular, steps in the Y direction are not needed. In addition to simplified production, the symmetric design also allows a uniform and therefore more predictable loading of the elements across the entire Y width. Continuing this thought, at least the two levers directly acting on the load receptor and/or all additional levers used for force translation or transmission can be divided substantially symmetrically by the above-mentioned X-Z plane.

As already discussed, an especially slim and compact construction of the bridge element is also achieved by the arrangement of the load cell between the base section and the load receptor. A particularly compact construction can be achieved if the load cell is arranged in the area between one of the two levers directly connected to the load receptor and the base section thereunder. The first two levers are then arranged directly and without significant intervening space underneath the load receptor, while construction space is left between these levers and the base section thereunder for components of a force compensation system according to the example of electromagnetic force compensation. In particular, an embodiment provides that the load cell is arranged underneath one lever directly connected to the load receptor, while a sensor that optically detects lever deflection is arranged between the other lever directly connected to the load receptor and the base section thereunder. This design is also particularly favorable if two levers of the bridge element are coupled to one another near the center in order to form a sum force there and to provide additional downstream levers if needed, while construction space to the left and right thereof in the X direction that is not used for additional levers can be used as described above.

A construction of the bridge element that is particularly advantageous because it is simple, accordingly provides that the load cell and the optical sensor are arranged at different lever arms of the same lever. This lever preferably extends across the center of the bridge element in the X direction, while the pivot axis of the lever can be arranged in the vicinity of this center in the X direction. Components of the force compensation system can then be arranged at the two arms of such a two-armed lever, in particular at their ends.

In the same sense, a load cell and an optical sensor provided for detecting a lever deflection can also be arranged on opposing sides of a Y-Z plane dividing the load receptor or the base section in the X direction—preferably symmetrically. Viewed in the X direction, the vertical plane is preferably situated at the position where the coupling point of the two levers to a coupling member is located. This plane especially advantageously divides the load receptor and/or the base section substantially symmetrically in the X direction.

A particularly compact design of the bridge element can also be achieved if the load receptor acts on an underside of the lever directly coupled to it. So long as the respective lever is likewise supported at this underside on the base element, no space-occupying thin sections or connecting points need be formed on the upper side of the lever, so that the lever and the load receptor can be arranged a very short distance away from one another. Moreover, the connections between the load receptor and the first two levers are then under tensile stress, which is preferred over a compressive stress on the thin sections. To connect the levers to the load receptor in the above-mentioned manner, the load receptor can extend in the X direction around the respective end of the lever that is directed away from the center in the X direction, so that the two levers lie substantially inside the load receptor in the X direction.

The bridge element according to the invention can be constructed from a monolithic material block. An extruded profile can be considered for this, or a monolithic body produced in some other manner, wherein the load receptor and the base section can also be formed by spark erosion or chip-breaking machining of the individual levers or the load receptor. An embodiment in which the width of the levers in the Y direction is equal to that of the load receptor and the base section can then be produced particularly easily, because steps in the Y direction can be almost completely eliminated and a substantially symmetrical construction of the levers relative to a vertical X-Z plane is possible. The only exception is possibly the area in which two levers are coupled to one another to form a sum force and, located one behind the other, act on a coupling member for that purpose. The mounting of components of an electromagnetic force compensation system could also require a shoulder in the Y direction. On the other hand, the thin sections and joints for coupling or bearing levers can then be advantageously formed over the entire Y-width of the bridge element. Thereby, the thin section firstly becomes particularly stable and secondly it can be formed, penetrating completely through the material block, in a single work step, without requiring subsequent or earlier production of step-like shoulders in the Y direction.

The bridge element according to the invention is advantageously suited for forming a gravimetric balance, the balance being intended to comprise at least one such bridge element.

One embodiment of the bridge element according to the invention and a balance formed therewith will be described in detail below with reference to the following figures.

DETAILED DESCRIPTION OF EXAMPLE EMBODIMENTS

Figure 1:
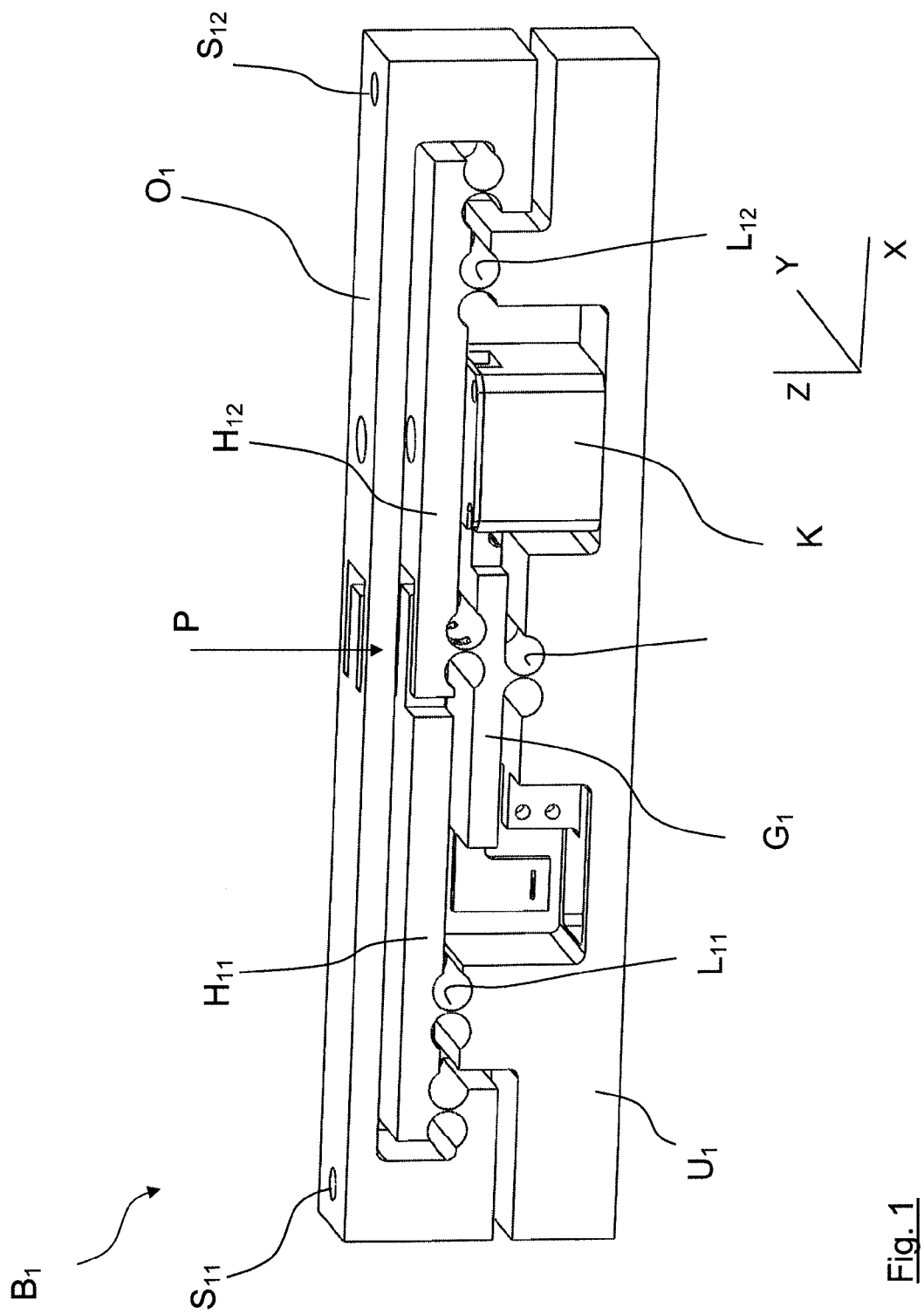
FIG. 1 shows a perspective view of a bridge element.

FIG. 1 shows a bridge element $B_1$ that extends along a first direction X from left to right in FIG. 1. The bridge element $B_1$ comprises a load receptor $O_1$ and a base section $U_1$ lying substantially congruently thereunder. The load receptor $O_1$ extends from a first end in the X direction to a second end. The base section $U_1$ correspondingly runs from a first end in the X direction to a second end. At its first end, the load receptor $O_1$ is connected via a point of action to a first lever $H_{11}$. The load receptor $O_1$ is connected at its second end to a second lever $H_{12}$ via a point of action in a comparable manner. Each of the two levers $H_{11}$ and $H_{12}$ is supported via a respective bearing point $L_{11}$ and $L_{12}$ on the base section $U_1$, which is to be considered stationary.

The load receptor $O_1$ is used for receiving a load that preferably will be introduced in the form of possibly differing component forces via a threaded connection point $S_{11}$ at the first end and a threaded connection point $S_{12}$ at the second end of the load receptor $O_1$.

At their ends that face away from the points of action, located roughly in the center of the bridge element $B_1$ in FIG. 1, the two levers $H_{11}$ and $H_{12}$ are jointly coupled to the coupling member $G_1$ at a coupling position P, in order to superimpose or combine the lever forces of the levers $H_{11}$ and $H_{12}$ at this point. The coupled levers $H_{11}$ and $H_{12}$ can be coupled one after another in the Y direction (as in FIG. 1) or one above the other in the Z direction (as in FIG. 2 or FIG. 3).

Due to the coupling of the levers $H_{11}$ and $H_{12}$ at the coupling position and by suitable selection of the lengths of the levers $H_{11}$ and $H_{12}$ (preferably equally long), the load receptor $O_1$ undergoes a parallel guidance along two vertical parallels in the downward Z direction when vertical (even different) component forces are introduced, in particular via a load pan or load plate mounted at the threaded connection points $S_{11}$ and $S_{12}$. The force-transferring or force-transmitting levers $H_{11}$ and $H_{12}$ inside the bridge element $B_1$ take on the transmission and stepping-down of the lever forces resulting from the weight force to be measured, as well as the function of parallel guidance.

(The bridge element $B_1$ could have additional levers ($H_{13}$, $H_{14}$ ... $H_{23}$, $H_{24}$ ... ), not shown here, with which the forces can be transmitted either before or after coupling by the coupling member.)

The coupling member $G_1$ is likewise constructed as a lever and, like the levers $H_{11}$ and $H_{12}$, can be pivoted clockwise or counterclockwise about a thin section joint $LG_1$ formed in or on the base section $U_1$; it is subjected to the sum force of the two levers $H_{11}$ and $H_{12}$ that is formed at the coupling position. A part of a load cell K, with which the deflection of the coupling member $G_1$ as a consequence of the load from the load receptor $O_1$ is to be compensated, is arranged at a first end of the coupling member $G_1$ (at the right end in FIG. 1). An element for position detection is arranged at the opposite, left end of the coupling member $G_1$ in order to detect and signal the deflection of this lever arm.

It can be seen in FIG. 1 that the force transferring or force stepping down levers, like the load cell K, are completely between the load receptor $O_1$ and the base section $U_1$ so that the bridge element $B_1$ forms a compact narrow weighing cell with parallel guidance. It may also be noted that the number of thin sections forming joints can be reduced to a minimum due to the space savings resulting from the parallel rod construction of the prior art. In the case illustrated in FIG. 1, despite the division of the weight force into two component forces at the two ends of the load receptor $O_1$ and double stepping-down (stage 1: levers $H_{11}/H_{12}$, second stage: lever arm from the coupling member $G_1$ to the load cell K), the bridge element requires a total of only six thin sections. Another thin section could be saved by forgoing the construction of the coupling member $G_1$ as a lever and instead using a direct coupling of the load cell K in the vertical direction underneath the coupling position, which significantly simplifies the formation of the bridge element $B_1$ as a weighing cell.

The coupling member $G_1$ can simultaneously be configured as a connecting element V, used to connect two bridge elements $B_1$, $B_2$ in the balance to one another, for combining the sum force formed in each bridge element into a single force. The connecting element V can also be used for connecting the bridge elements at a downstream step-down stage, however. The downstream step-down stage adjoins the coupling member and the latter adjoins the connecting element. The force introduced into the connecting element V then forms the sum of the once again stepped-down sum forces of each bridge element. This case can be seen in FIGS. 2 and 3.

Figure 2:
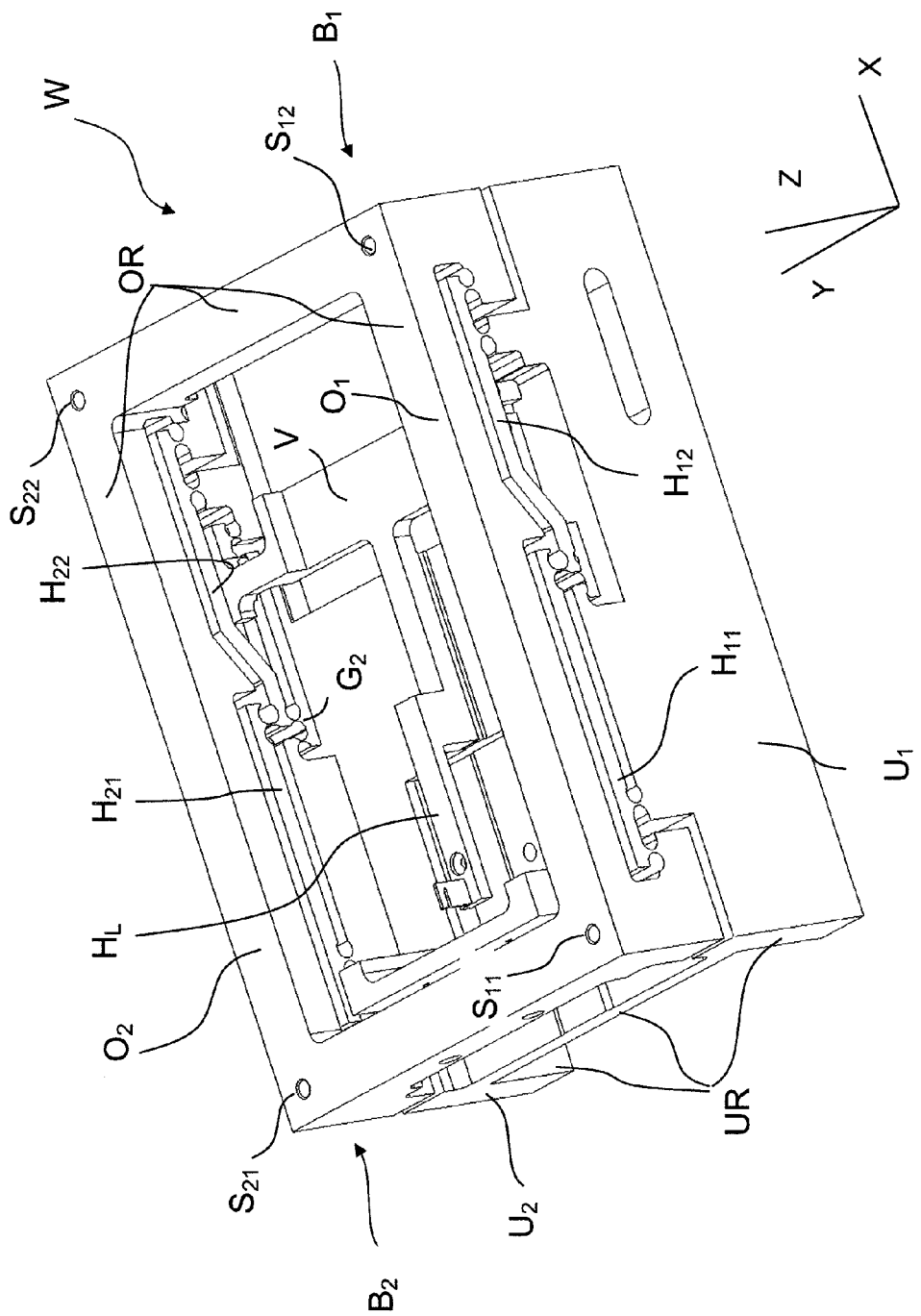
FIG. 2 shows a weighbridge formed from two bridge elements.
Figure 3:
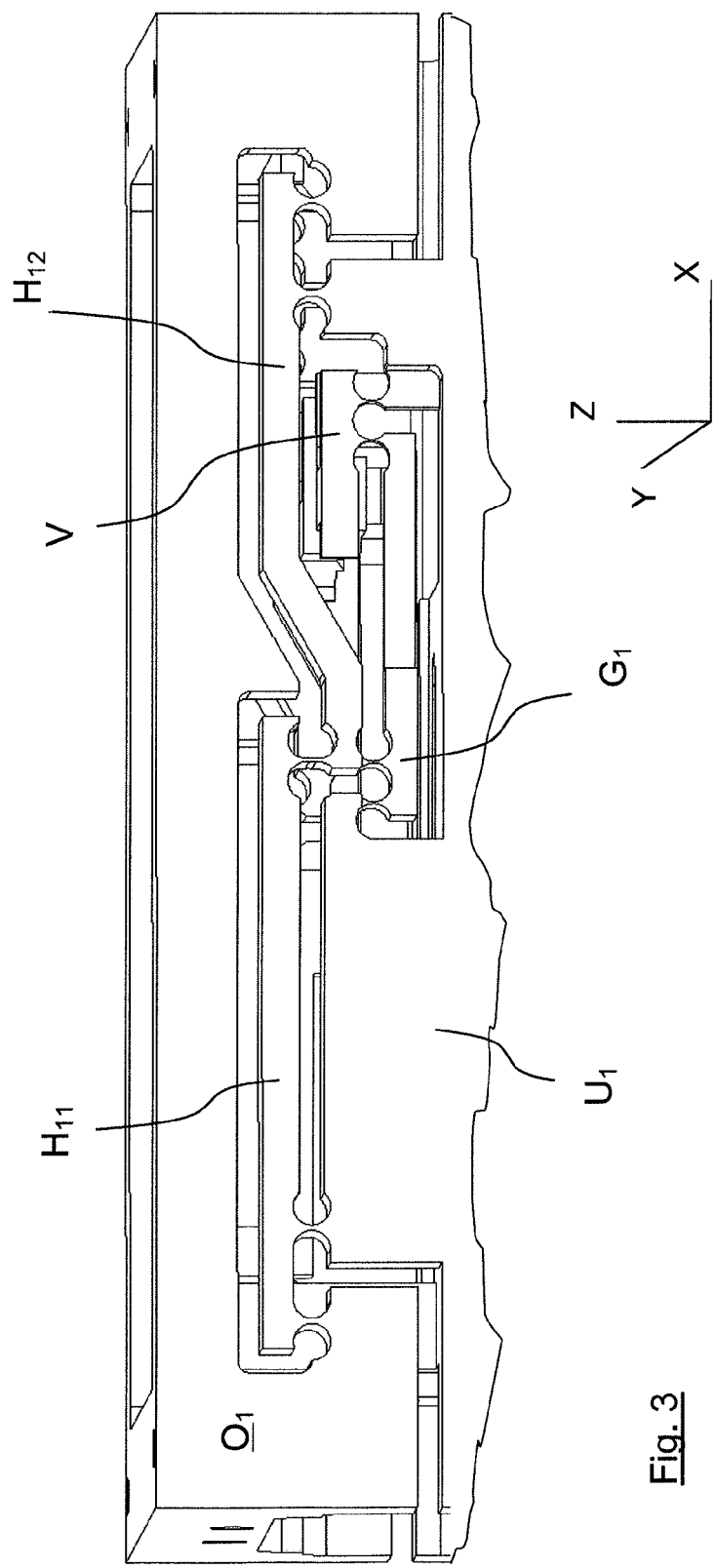
FIG. 3 shows an enlarged portion of the first bridge element of FIG. 2.

FIG. 2 shows a weighbridge W according to the invention using two bridge elements $B_1$, $B_2$. (FIG. 3 shows a schematic side view of FIG. 2 as a cutout). A first bridge element $B_1$ shown in the foreground is formed integrally with an additional bridge element $B_2$, in which the respective load receptors $O_1$, $O_2$ and the base sections $U_1$, $U_2$ are combined into a one-piece lower frame UR or upper frame OR. Threaded connection points $S_{11}$ $S_{12}$, $S_{21}$, $S_{22}$ formed on the upper frame OR for each load receptor $O_1$, $O_2$ allow the connection of a load plate or weighing dish on which the material to the weighed is placed.

Analogously to the individual representation of FIG. 1, the respective levers $H_{11}$, $H_{12}$, $H_{21}$, $H_{22}$ of each bridge element are again coupled to one another in order to form a sum force, the separate coupling members $G_1$, $G_2$ ($G_1$ is difficult to see in FIG. 2 and not labeled) being constructed for each element as levers that are supported at the left end on the lower frame UR as the pivot axis and extend substantially to the right in the X direction.

In the right section of the weighbridge W, each of the two levers of the coupling members $G_1$, $G_2$ acts on a connecting element V connecting the two bridge elements $B_1$, $B_2$, whereby the sum forces formed in each bridge element, or their forces further stepped down by the levers $G_1$, $G_2$, are jointly introduced into the connecting element V. This connecting element V is likewise constructed as a lever that is supported at its right end on the lower frame UR via a bearing point acting as a pivot axis. The connecting element V is simultaneously the final lever HL, which is used for stepping down. It then combines the forces formed separately by the bridge elements and extends in the area between the two opposing bridge elements by a certain amount in the X direction opposite to the two coupling members $G_1$, $G_2$ (to the left in FIGS. 2 and 3). The final lever HL acts there on a load cell or a component of a force compensation system, not shown in detail.

Unlike the bridge element $B_1$ shown in FIG. 1, the two jointly constructed bridge elements of the weighbridge according to FIGS. 2 and 3 do not have a load cell K of their own assigned to each bridge element. Because the weighbridge combines the forces of the individual bridge elements only by means of the connecting element V and this connecting element V extends in the Y direction transverse to the two bridge elements, the load cell in this case is expediently arranged in the interior of the weighbridge, i.e., between the two bridge elements. The remaining construction space kept free can be used for housing calibration plates and weights, electronic components, vibration and acceleration sensors, etc.

The first two levers of the bridge element from FIG. 1 further differ from those of FIGS. 2 and 3, because the latter combine or couple a straight lever $H_{11}$ and $H_{21}$, and a bent or angled lever $H_{12}$ and $H_{22}$, respectively.

Figure 4:
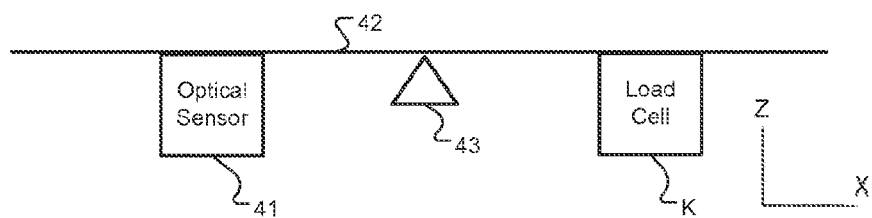
FIG. 4 is a diagrammatic representation of a bridge element according to another embodiment.

FIG. 4 shows a diagram of a version of the bridge element that is particularly advantageous because it is simple, accordingly provides that the load cell K and the optical sensor 41 are arranged at different lever arms of the same lever 42. This lever 42 preferably extends across the center of the bridge element in the X direction, while the pivot axis 43 of the lever can be arranged in the vicinity of this center in the X direction. Components of the force compensation system can then be arranged at the two arms of such a two-armed lever, in particular at their ends.

Figure 5:
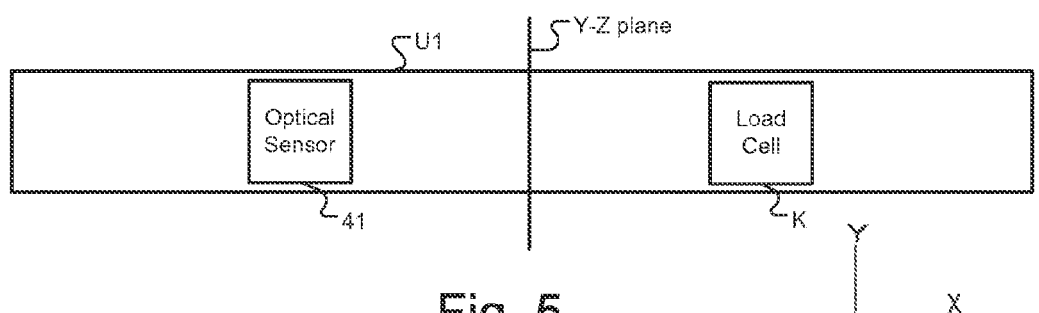
FIG. 5 is a diagrammatic representation of another bridge element.

FIG. 5 shows a diagram of a device in which, in the same sense, a load cell K and an optical sensor 41 provided for detecting a lever deflection can also be arranged on opposing sides of a Y-Z plane dividing the base section U1 in the X direction—preferably symmetrically. Viewed in the X direction, the vertical plane is preferably situated at the position where the coupling point of the two levers to a coupling member is located. This plane especially advantageously divides the load receptor and/or the base section substantially symmetrically in the X direction.

LIST OF REFERENCE NUMBERS $B_i$ Bridge element with index i
$G_i$ Coupling member of the bridge element i
$H_{ij}$ Lever j of the bridge element i
$H_L$ Final lever
K Load cell
$L_{ij}$ Bearing point of the lever j on the bridge element i
$O_i$ Load receptor of the bridge element i
OR Upper frame
P Coupling position
$S_{ij}$ Threaded fastening point j of the load receptor i
$U_i$ Base section of the bridge element i
UR Lower frame
V Connecting element
W Weighbridge
X, Y, Z Directions in space
41 Optical Sensor
42 Lever
43 Pivot Axis

The invention claimed is:

1. A precision weighing device comprising:
   (a) a bridge element including
      (i) a base section which extends along a first longitudinal direction (X);
      (ii) a load receptor, which likewise extends in the first longitudinal direction (X) and is arranged vertically above the base section in a second vertical direction (Z) perpendicular to the first longitudinal direction (X);
      (iii) a first lever and a second lever each extending in the first longitudinal direction (X) and arranged beneath the load receptor in the second vertical direction (Z) and each connected to the load receptor in a manner designed to bear a load from the load receptor; and
      (iv) first and second bearing points on the base section, connected to and supporting as fulcrums the first and second levers, respectively; and
   (b) a load cell arranged in the second vertical direction (Z) between the base section and the load receptor and in the first longitudinal direction (X) between the two bearing points, wherein the first and second levers are coupled to one another at a common coupling position on a coupling member to combine the first and second lever forces to form a sum force in order to transmit the sum force to the load cell, the common coupling position comprising a position along the first longitudinal direction (X) at which the first and second levers are both coupled to the coupling member.

2. The precision weighing device of claim 1, further comprising at least one additional lever coupled between the common coupling position and the load cell for transmitting the sum force to the load cell with a change in magnitude.

3. The precision weighing device of claim 1, further comprising at least two additional levers coupled between the common coupling position and the load cell for transmitting the sum force to the load cell with a change in magnitude, arranged one above another in the second vertical direction (Z) between the base section and the load receptor.

4. The precision weighing device of claim 3, wherein the first and second levers and the additional levers are arranged on the bridge element in such a manner that the projection of each respective lever onto an X-Y plane (defined by the first longitudinal direction (X) and a third direction (Y) perpendicular to the first longitudinal direction (X) and the second vertical direction (Z)) does not extend beyond a projection of the base section or the load receptor onto the X-Y plane at least in the first longitudinal direction (X) and in the third direction (Y).

5. The precision weighing device of claim 3, wherein the at least two additional levers are coupled at a respective common coupling position on a respective coupling member in order to combine lever forces and transfer them as a sum force.

6. The precision weighing device of claim 3, characterized in that an X-Z plane defined to divide the load receptor and the base section symmetrically also divides the first and second levers and the at least two additional levers symmetrically.

7. The precision weighing device of claim 1, wherein the first and second levers and the load cell are arranged on the bridge element in such a manner that the projection of each respective lever and the load cell onto an X-Y plane (defined by the first longitudinal direction (X) and a third direction (Y) perpendicular to the first longitudinal direction (X) and the second vertical direction (Z)) does not extend beyond a projection of the base section or the load receptor onto the X-Y plane at least in the first longitudinal direction (X) and in the third direction (Y).

8. The precision weighing device of claim 1, characterized in that an X-Z plane defined to divide the load receptor and the base section symmetrically also divides the first and second levers symmetrically.

9. The precision weighing device of claim 1, wherein the load receptor is guided relative to the base section by the first and second levers along vertical parallels in the second vertical direction (Z).

10. The precision weighing device of claim 1, wherein pivot axes of the first and second levers at the bearing points lie in a common plane which is horizontal as defined by vertical as the second vertical direction (Z).

11. The precision weighing device of claim 1, wherein the first and second levers have equal lever ratios.

12. The precision weighing device of claim 1, wherein the load cell is arranged in the second vertical direction (Z) between one of the first and second levers and the base section.

13. The precision weighing device of claim 1, wherein the load cell and an optical sensor provided for detecting a lever deflection are arranged at different lever arms of the same lever.

14. The precision weighing device of claim 1, wherein the load cell and an optical sensor provided for detecting a lever deflection are arranged on opposite sides of a Y-Z plane dividing the base section roughly symmetrically in the first longitudinal direction (X).

15. The precision weighing device of claim 1, wherein the load receptor acts on the underside of the first and second levers.

16. A precision weighing device comprising:
(a) a bridge element including
   (i) a base section which extends along a first longitudinal direction (X);
   (ii) a load receptor, which likewise extends in the first longitudinal direction (X) and is arranged vertically above the base section in a second vertical direction (Z) perpendicular to the first longitudinal direction (X);
   (iii) a first lever and a second lever each extending in the first longitudinal direction (X) and arranged beneath the load receptor in the second vertical direction (Z) and each connected to the load receptor in a manner designed to bear a load from the load receptor; and
   (iv) first and second bearing points on the base section, connected to and supporting as fulcrums the first and second levers, respectively; and
(b) a load cell arranged in the second vertical direction (Z) between the base section and the load receptor, wherein the first and second levers are coupled to one another at a common coupling position on a coupling member to combine the first and second lever forces to form a sum force in order to transmit the sum force to the load cell, the common coupling position comprising a position along the longitudinal direction (X) at which the first and second levers are both coupled to the coupling member.

17. The precision weighing device of claim 16, further comprising at least one additional lever coupled between the coupling member and the load cell to transmit the sum force to the load cell with a change in magnitude.

18. The precision weighing device of claim 16, further comprising at least two additional levers coupled between the coupling member and the load cell to transmit the sum force to the load cell with a change in magnitude, arranged one above another in the second vertical direction (Z) between the base section and the load receptor.

19. The precision weighing device of claim 18, wherein the first and second levers and the additional levers are arranged on the bridge element in such a manner that the projection of each respective lever onto an X-Y plane (defined by the first longitudinal direction (X) and a third direction (Y) perpendicular to the first longitudinal direction (X) and the second vertical direction (Z)) does not extend beyond a projection of the base section or the load receptor onto the X-Y plane at least in the first longitudinal direction (X) and in the third direction (Y).

* * * * *